US006843741B2

(12) United States Patent
Fujii

(10) Patent No.: US 6,843,741 B2
(45) Date of Patent: Jan. 18, 2005

(54) BELL CRANK ASSEMBLY AND MOUNTING BRACKET FOR A BICYCLE HUB TRANSMISSION

(75) Inventor: Kazuhiro Fujii, Kawachinagano (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/215,720

(22) Filed: Aug. 8, 2002

(65) Prior Publication Data

US 2002/0190173 A1 Dec. 19, 2002

Related U.S. Application Data

(62) Division of application No. 09/476,455, filed on Dec. 30, 1999.

(51) Int. Cl.⁷ .......................... F16H 63/04; B62M 25/02
(52) U.S. Cl. .......................... 474/70; 474/80; 280/238; 74/473.14
(58) Field of Search .............................. 474/70, 71, 69, 474/78, 80, 81, 82; 280/261, 238; 74/473.13, 473.14, 473.12, 500.5, 502.2, 501.6, 371; 475/298, 289, 312, 297

(56) References Cited

U.S. PATENT DOCUMENTS

| 2,269,947 | A | | 1/1942 | Ludwig |
| 2,892,927 | A | | 6/1959 | Rosenblum |
| 3,184,993 | A | | 5/1965 | Swenson |
| 3,990,715 | A | | 11/1976 | Shimada |
| 4,052,914 | A | * | 10/1977 | Nakajima .................. 475/285 |
| 4,179,953 | A | | 12/1979 | Hanada et al. |
| 4,486,182 | A | * | 12/1984 | Coue ........................ 474/80 |
| 4,490,127 | A | | 12/1984 | Matsumoto et al. |
| 4,617,006 | A | * | 10/1986 | Nagano ..................... 474/80 |
| 5,182,962 | A | * | 2/1993 | Leiter ....................... 280/238 |
| 5,222,706 | A | | 6/1993 | Hoshino |
| 5,230,495 | A | | 7/1993 | Brackus |
| 5,469,755 | A | * | 11/1995 | Steuer et al. ............... 74/371 |
| 5,470,277 | A | * | 11/1995 | Romano ..................... 474/70 |
| 5,533,937 | A | * | 7/1996 | Patterson et al. ............ 474/80 |
| 5,562,563 | A | * | 10/1996 | Shoge ....................... 475/298 |
| 5,577,969 | A | * | 11/1996 | Watarai ..................... 474/78 |
| 5,722,296 | A | | 3/1998 | Nishigai et al. |
| 5,816,966 | A | * | 10/1998 | Yang et al. .................. 474/82 |
| 5,885,024 | A | | 3/1999 | Zupan et al. |
| 6,118,661 | A | | 9/2000 | Lo |
| 6,134,980 | A | * | 10/2000 | Uchiyama ................ 74/473.14 |
| 6,135,905 | A | * | 10/2000 | Soon ......................... 474/82 |
| 6,155,585 | A | | 12/2000 | Busby |
| 6,234,927 | B1 | * | 5/2001 | Peng ......................... 474/82 |
| 6,241,206 | B1 | | 6/2001 | Kam |
| 6,254,048 | B1 | | 7/2001 | Ashley et al. |
| 6,257,533 | B1 | | 7/2001 | Pei et al. |
| 2001/0046916 | A1 | | 11/2001 | Fujii |
| 2002/0004432 | A1 | * | 1/2002 | Steuer et al. ................ 474/80 |

FOREIGN PATENT DOCUMENTS

| DE | 3314229 A | * | 10/1984 | ......... B62M/25/02 |
| DE | 3440066 A1 | * | 5/1986 | ......... B62M/25/04 |
| FR | 2252245 A | * | 6/1975 | ........... B62M/1/04 |
| JP | 50-140159 | | 5/1975 | |
| JP | 58-101893 A | | 6/1983 | |
| JP | 6-48369 A | | 2/1994 | |
| JP | 08127383 A | * | 5/1996 | ............ B62M/9/12 |

* cited by examiner

Primary Examiner—Marcus Charles
(74) Attorney, Agent, or Firm—James A. Deland

(57) ABSTRACT

A bell crank for a bicycle hub transmission includes a wire connecting bell crank member for connecting to a control wire, an actuator moving bell crank member for moving an actuating member, and an adjusting mechanism for adjusting a position of the wire connecting bell crank member relative to the actuator moving bell crank member.

35 Claims, 7 Drawing Sheets

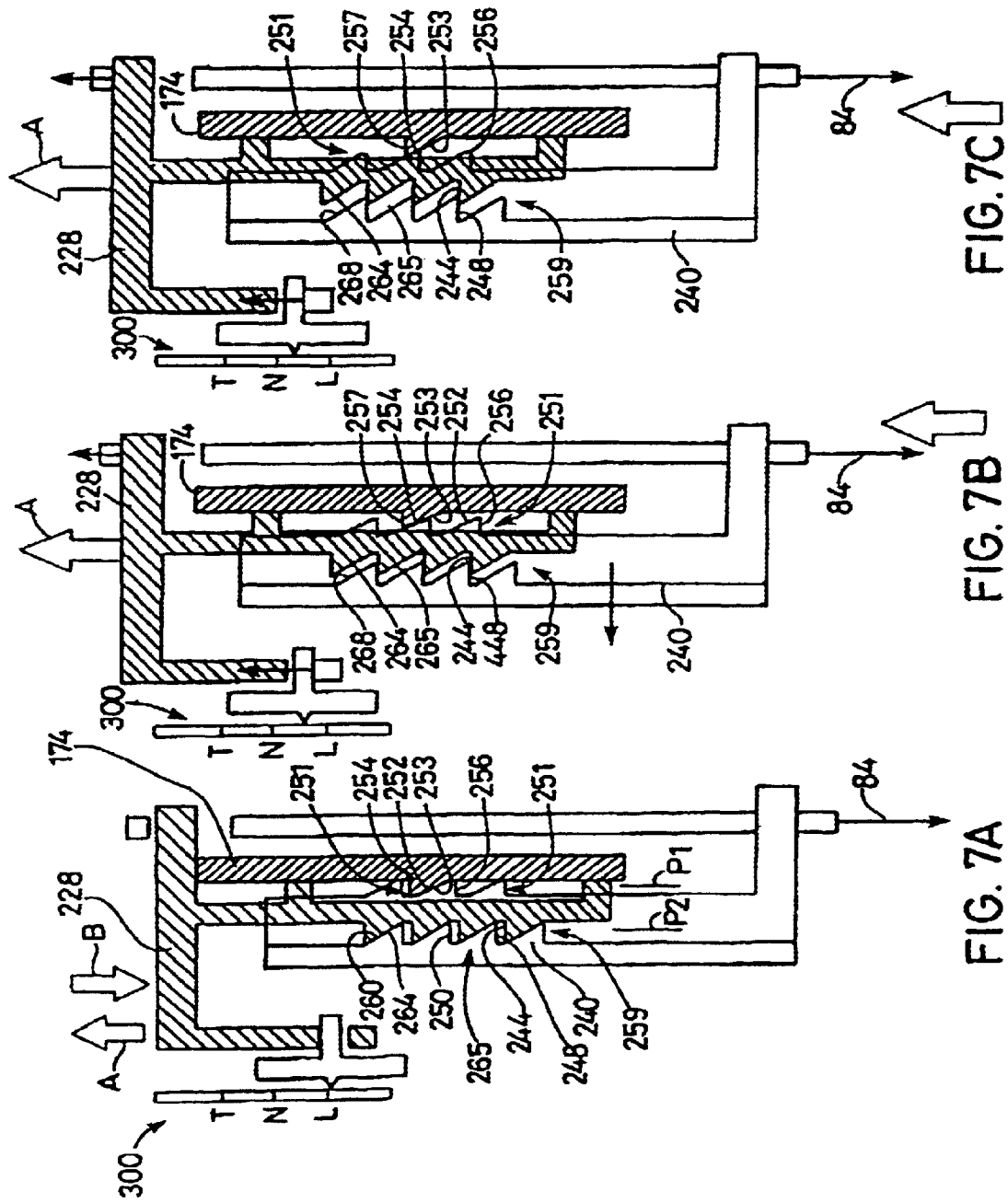

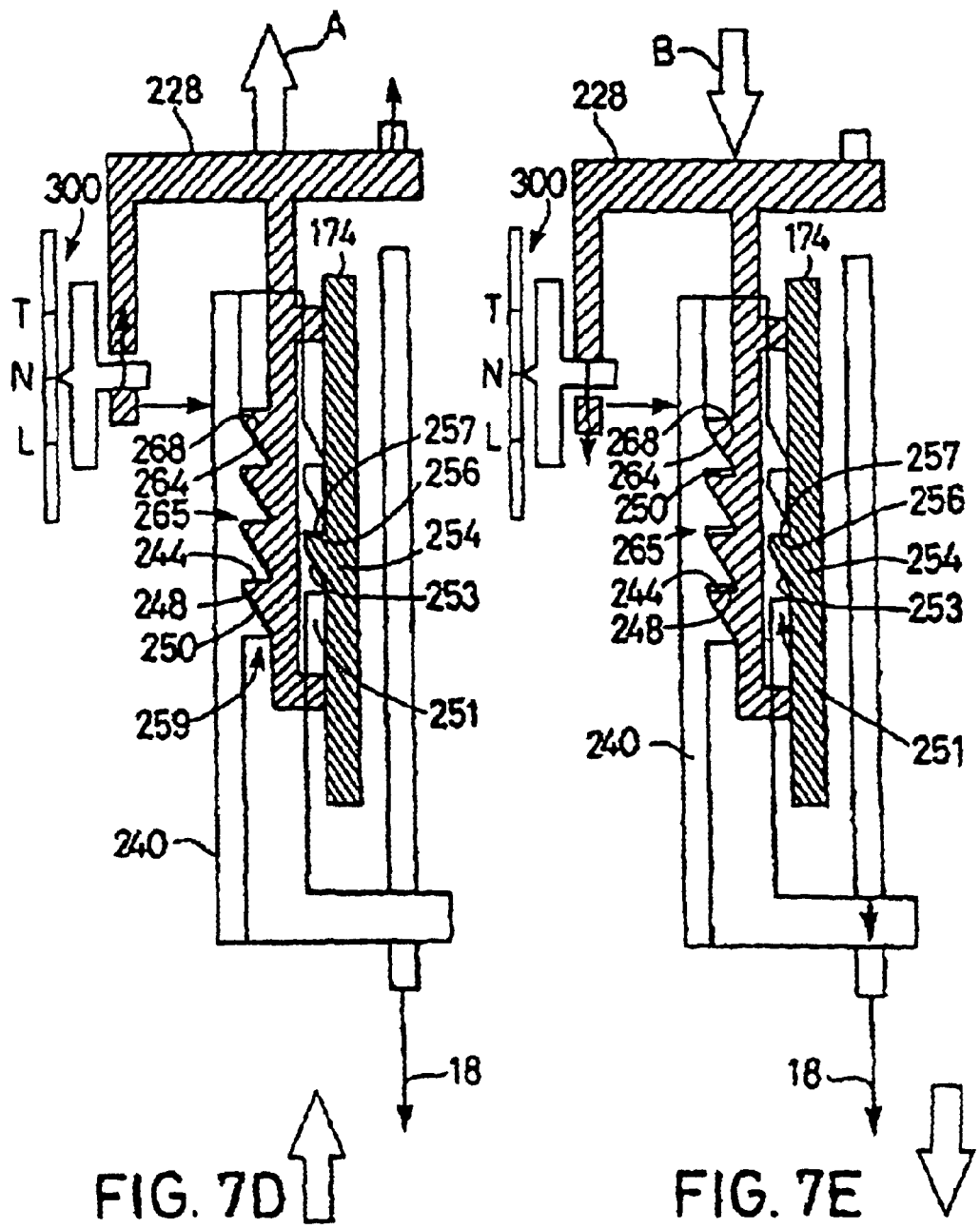

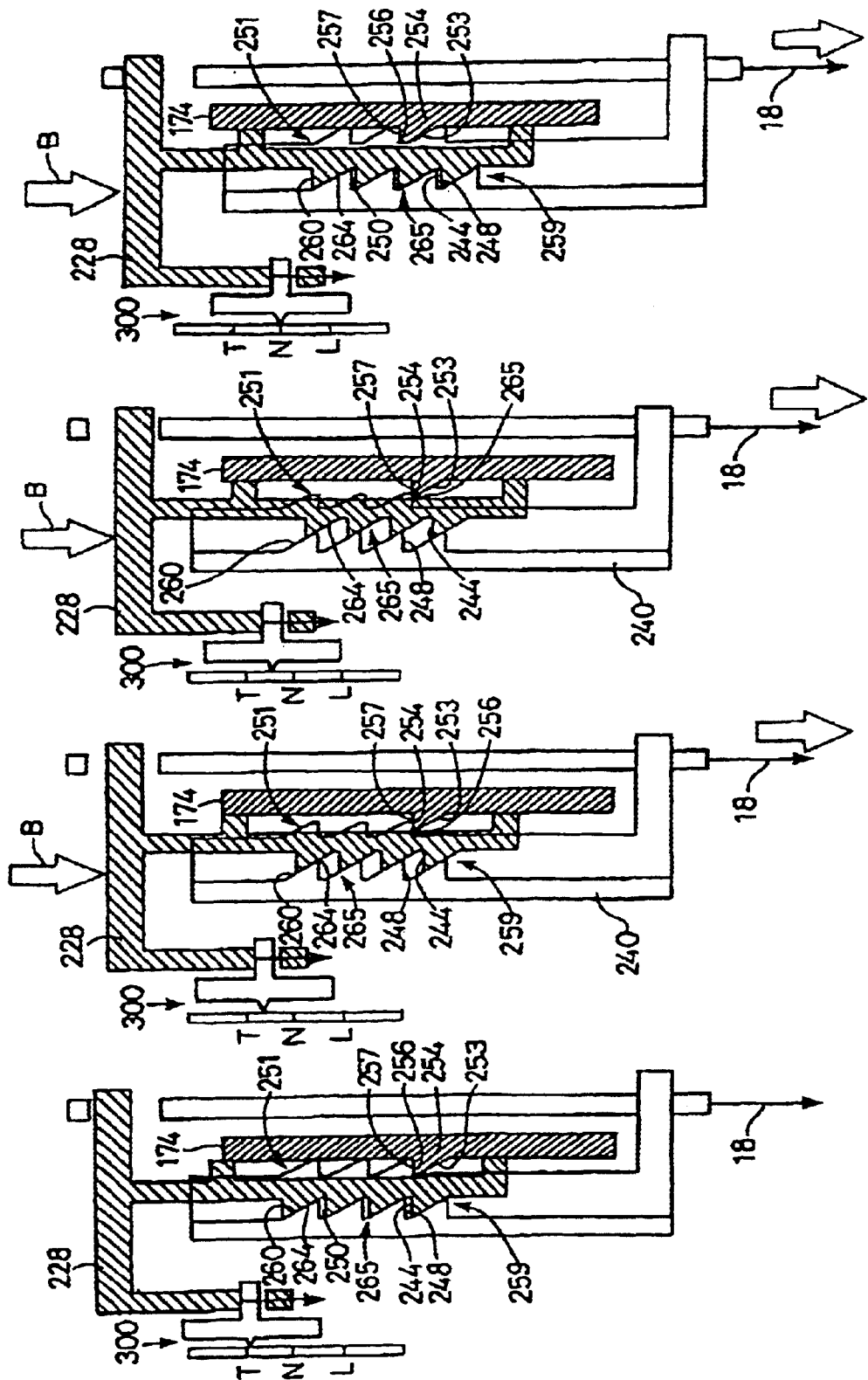

BELL CRANK ASSEMBLY AND MOUNTING BRACKET FOR A BICYCLE HUB TRANSMISSION

CROSS REFERENCE TO RELATED APPLICATIONS

This application is a division of copending application Ser. No. 09/476,455, filed Dec. 30, 1999.

BACKGROUND OF THE INVENTION

The present invention is directed to control devices for bicycles and, more particularly, to a motor driven shifting device for shifting a bicycle transmission.

There are two major types of bicycle transmissions currently marketed. One type of bicycle transmission uses a derailleur to shift a chain from one sprocket to another to change the drive ratio, and the other type uses a planetary gear mechanism disposed inside a rotating hub such as a wheel hub to change the drive ratio. In either case, an operating member such as a lever, push rod or rotatable ring is moved to operate the transmission, and the operating member is connected to a transmission actuating member such as a control wire or link that is pulled or released by the rider to cause the desired movement of the operating member. To facilitate the operation of the transmission in a pull and release manner, a return spring commonly is used to bias the operating member to an initial state. The transmission then is operated by moving the operating member against the progressively increasing force of the return spring and the natural resistance by the transmission to changing gears.

Motor driven bicycle transmissions are becoming more common. Such motor driven bicycle transmissions relieve the rider of the task of manually pulling and releasing the transmission actuating member. A typical motor driven bicycle derailleur transmission is disclosed in U.S. Pat. No. 4,490,127. In that patent a motor is connected to a wire winding member through a gear reduction mechanism for pulling and releasing a control wire coupled to the derailleur. The motor usually is mounted to the frame somewhat remote from the bicycle transmission to accommodate the length of control wire. When a motor drive unit is used with a hub transmission of the type that is controlled by an actuating rod slidably disposed in the hub axle, then the control wire must be connected to a bell crank mechanism or some other lever mechanism that moves the actuating rod. The size and shape of the bell crank mechanism and the actuating rod are not always known in advance, so the installer must mount the bell crank mechanism to the bicycle, mount the motor to the bicycle, determine the optimum length of control wire to use with the system, and connect the entire system together. Thus, mounting such a motor driven system can be very complicated. If there is some incompatibility between the bell crank mechanism and the hub transmission, such as that which occurs when the actuating rod is too short or too long for the available bell crank mechanism, or if there is some incompatibility between the bell crank mechanism and the motor drive unit, then the installer must somehow adapt the incompatible part. This can be very difficult if not impossible to accomplish.

SUMMARY OF THE INVENTION

The present invention is directed to a bell crank assembly and/or mounting bracket for a motor driven bicycle hub transmission that is economical to manufacture, that can be mounted easily to the bicycle, and that can be adjusted to accommodate different hub transmissions or motor drive units. In one embodiment of the present invention, a bell crank for a bicycle hub transmission includes a wire connecting bell crank member for connecting to a control wire, an actuator moving bell crank member for moving an actuating member, and an adjusting mechanism for adjusting a position of the wire connecting bell crank member relative to the actuator moving bell crank member. The adjusting mechanism allows the bell crank mechanism to be adjusted to fit the size of the actuating rod used to operate the transmission and/or to accommodate variations in the length of a control wire connected between the bell crank mechanism and the motor drive unit.

In a more specific embodiment, the wire connecting bell crank member and the actuator moving bell crank member rotate around a common axis, and the adjusting mechanism adjusts a rotational angle of the wire connecting bell crank member relative to the actuator moving bell crank member. The adjusting mechanism may comprise an adjusting screw retained to one of the wire connecting bell crank member and the actuator moving bell crank member. The adjusting screw includes a screw end that provides a pressing force against the other one of the wire connecting bell crank member and the actuator moving bell crank member to adjust a rotational angle of the wire connecting bell crank member relative to the actuator moving bell crank member.

The bracket used to mount a motor drive unit and a bell crank assembly according to the present invention to a bicycle includes a motor mounting bracket portion for mounting the motor, a transition bracket portion extending from the motor mounting bracket portion for accommodating a control cable used to operate the bell crank mechanism, and a rear frame mounting bracket portion extending from the transition bracket portion. A bell crank mounting member is disposed on one of the transition bracket portion and the rear frame mounting bracket portion for mounting the bell crank assembly. Thus, the entire motor drive and bell crank assembly may be mounted to the bicycle as a unit by mounting the bracket to the bicycle. The transition bracket portion is inclined relative to one of the motor mounting bracket portion and the rear frame mounting bracket portion to facilitate mounting the motor drive mechanism to the bicycle.

BRIEF DESCRIPTION OF THE DRAWINGS

FIGS. 7A–7E are schematic views showing the operation of the takeup mechanism when the motor rotates in a first direction; and FIGS. 8A–8D are schematic views showing the operation of the takeup mechanism when the motor rotates in a second direction.

DETAILED DESCRIPTION OF THE EMBODIMENTS

Figure 1:
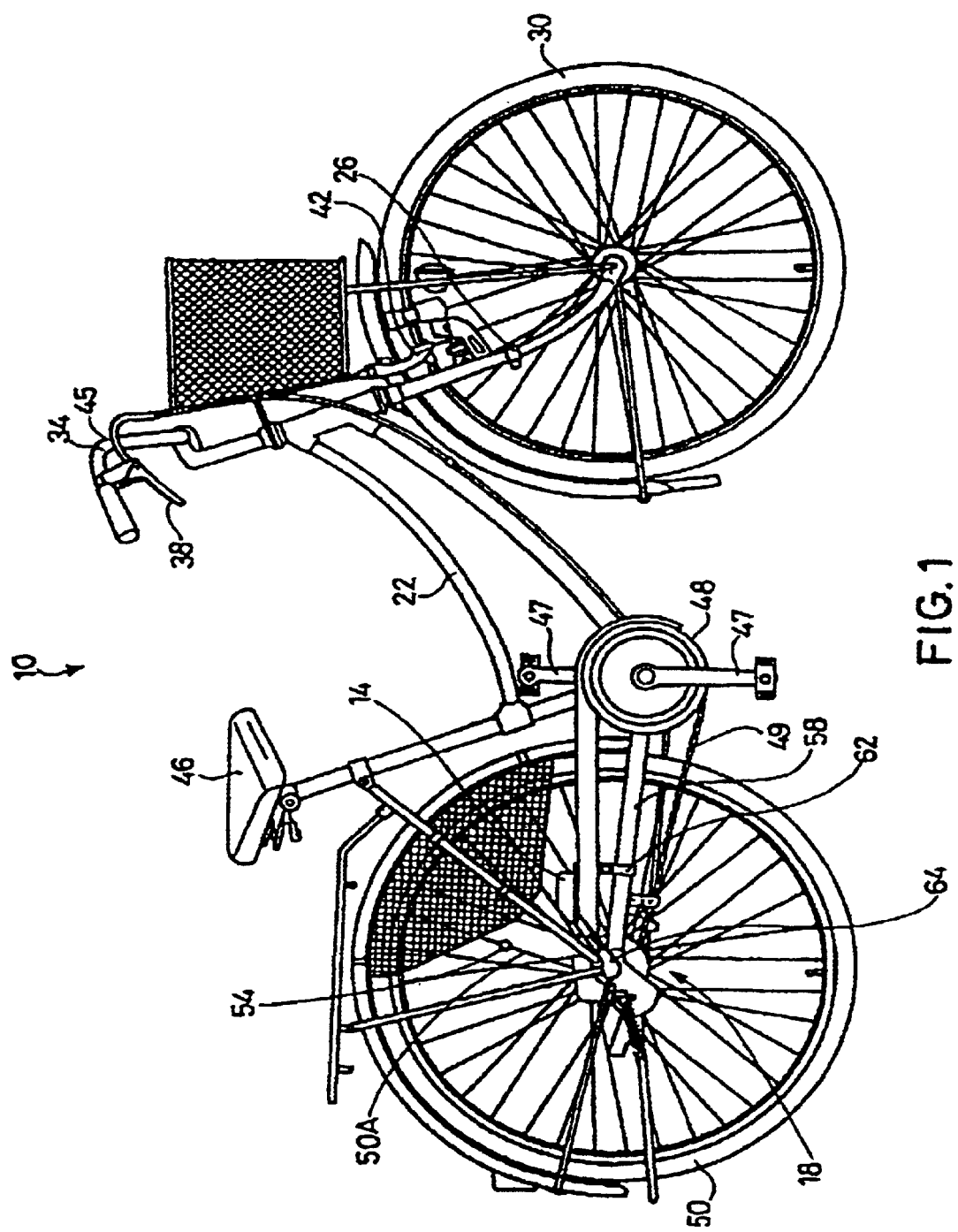
FIG. 1 is a side view of a bicycle which incorporates a particular embodiment of a bicycle shift control device according to the present invention.

FIG. 1 is a side view of a bicycle 10 that uses a motor drive unit 14 including a particular embodiment of a shift control device according to the present invention for a bicycle transmission 18. Bicycle 10 includes a frame 22, a fork 26 rotatably mounted to frame 22 for rotatably supporting a front wheel 30, a handlebar 34 mounted to fork 26, a brake lever 38 mounted to handlebar 34 for operating a front wheel caliper brake 42, a seat 46, pedal cranks 47 rotatably mounted to frame 22 for rotating a front chainwheel 48 connected to a chain 49, and a rear wheel 50 rotatably mounted to frame 22. In this embodiment, bicycle transmission 18 is an internal wheel hub transmission that has a planetary gear mechanism for changing the gear ratio by routing a rotational force applied by chain 49 through a plurality of transmission paths in a well-known manner. A signal providing unit such as a magnet 54 is mounted to one of the spokes 50A of wheel 50. The magnetic signal provided by magnet 54 is used by motor drive unit 14 to control the shifting of transmission according to the speed of the bicycle. Motor drive unit 14 is mounted to a chainstay 58 of bicycle frame 22 by a mounting bracket 62 and by a bell crank housing 64. Motor drive unit 14 controls transmission 18 by a bell crank assembly 68 (FIG. 4) described below.

Figure 2:
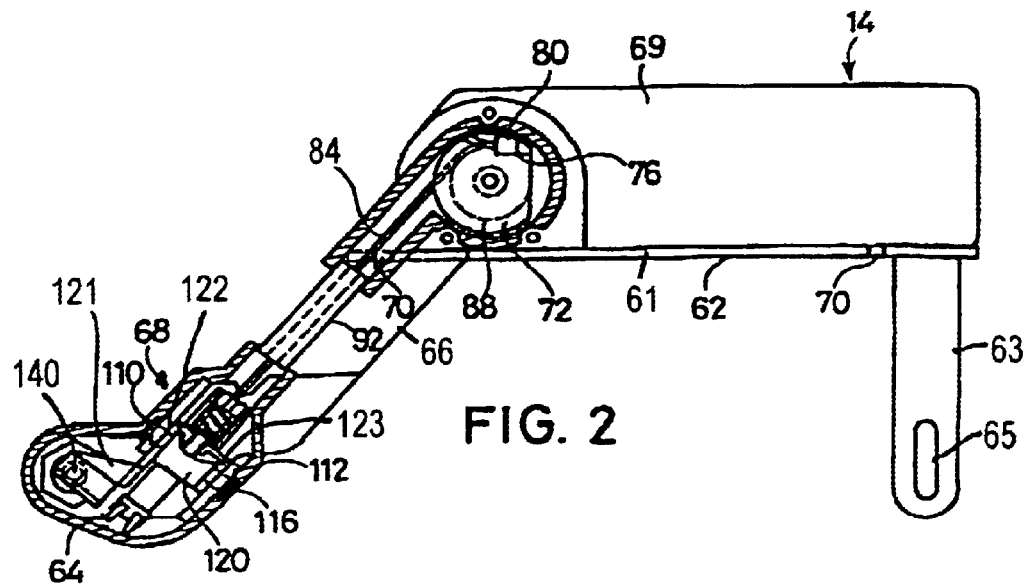
FIG. 2 is a partial cross-sectional view of the motor drive unit and mounting bracket shown in FIG. 1.
Figure 3:
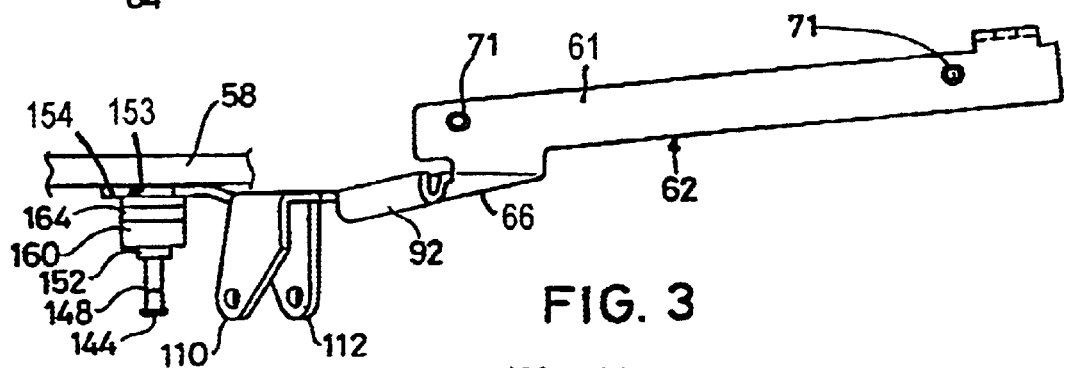
FIG. 3 is a top view of the mounting bracket for the motor drive unit shown in FIG. 2.
Figure 4:
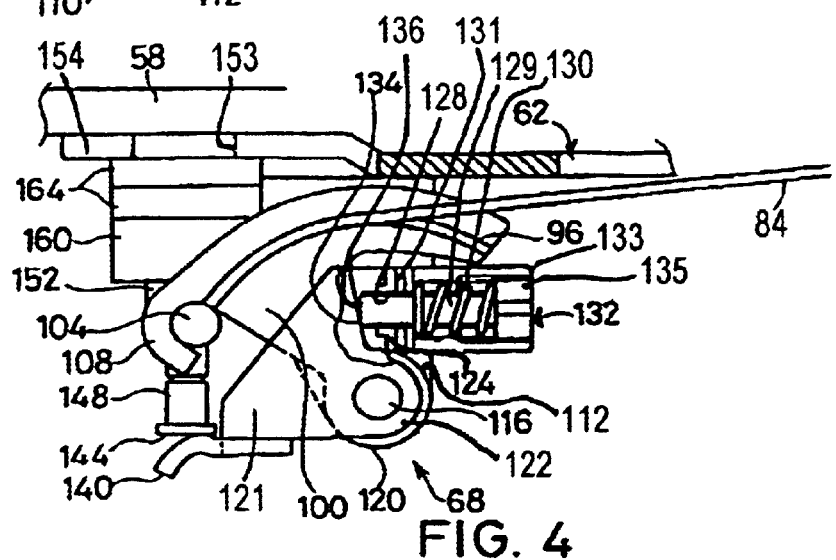
FIG. 4 is a more detailed view of the bell crank assembly shown in FIG. 2.

FIG. 2 is a partial cross-sectional view of motor drive unit 14 and mounting bracket 62, FIG. 3 is a top view of mounting bracket 62 with the bell crank assembly 68 removed, and FIG. 4 is a more detailed view of bell crank assembly 68. As shown in those Figures, motor drive unit 14 includes a housing 69 that is mounted to a motor mounting bracket portion 61 of bracket 62 by screws 70 that extend through mounting holes 71 in bracket 62 and screw into housing 69. A front frame mounting bracket portion 63 having a screw mounting opening 65 extends downward perpendicular to motor mounting bracket portion 63 for mounting to chainstay 58. A takeup member 72 in the form of a winding drum has a wire connector 76 for retaining the cable end bead 80 of a control member in the form of a control wire 84 and a winding surface 88 for winding and unwinding control wire 84. Control wire 84 passes through a U-shaped or convex guide channel 92 formed on a transition bracket portion 66 extending downwardly at an incline relative to motor mounting bracket portion 61, engages a winding surface 96 of a cable connecting bell crank member 100 and terminates with another cable end bead 104 retained in a slotted wire connector 108 formed on cable connecting bell crank member 100.

Cable connecting bell crank member 100 is pivotally mounted to opposed mounting ears 110 and 112 formed on transition bracket portion 66 below guide channel 92 by a pivot shaft 116 that passes through a spacer 120 formed on cable connecting bell crank member 100 and into mounting ears 110 and 112. An actuator moving bell crank member 121 has mounting ears 122 and 123 for pivotably mounting actuator moving bell crank member 121 to mounting ears 110 and 112 by pivot shaft 116 such that spacer 120 is disposed between mounting ears 122 and 123. A wall 124 extending between mounting ears 122 and 123 includes a threaded bore 128 for supporting a threaded shaft 129 of an adjusting screw 132. A spring 130 is disposed between an end wall 131 of a screw-turning cap 133 and a head 135 of adjusting screw 132. Screw-turning cap 133 contacts head 135 of adjusting screw 132 so that rotating screw-turning cap 133 rotates adjusting screw 132. An end 136 of adjusting screw 132 contacts a side 134 of cable connecting bell crank member 100 to adjust the rotational position of cable connecting bell crank member 100 relative to actuator moving bell crank member 121. Actuator moving bell crank member 121 includes a contact portion 140 for pressing against an end 144 of an actuating rod 148 that is slidingly disposed in a hub axle 152 of bicycle transmission 18. Thus, variations in the length of cable wire 84 and/or actuating rod 148 may be accommodated by rotating adjusting screw 132. Hub axle 152 and a rear frame mounting bracket portion 154 of bracket 62 are mounted to chainstay 58 by a fixing nut 160 and washers 164. Preferably, rear frame mounting bracket portion 154 includes an opening 153 for receiving axle 152 therethrough. Actuating rod 148 is used to shift gears in the hub transmission 18 in a well known manner.

Figure 5:
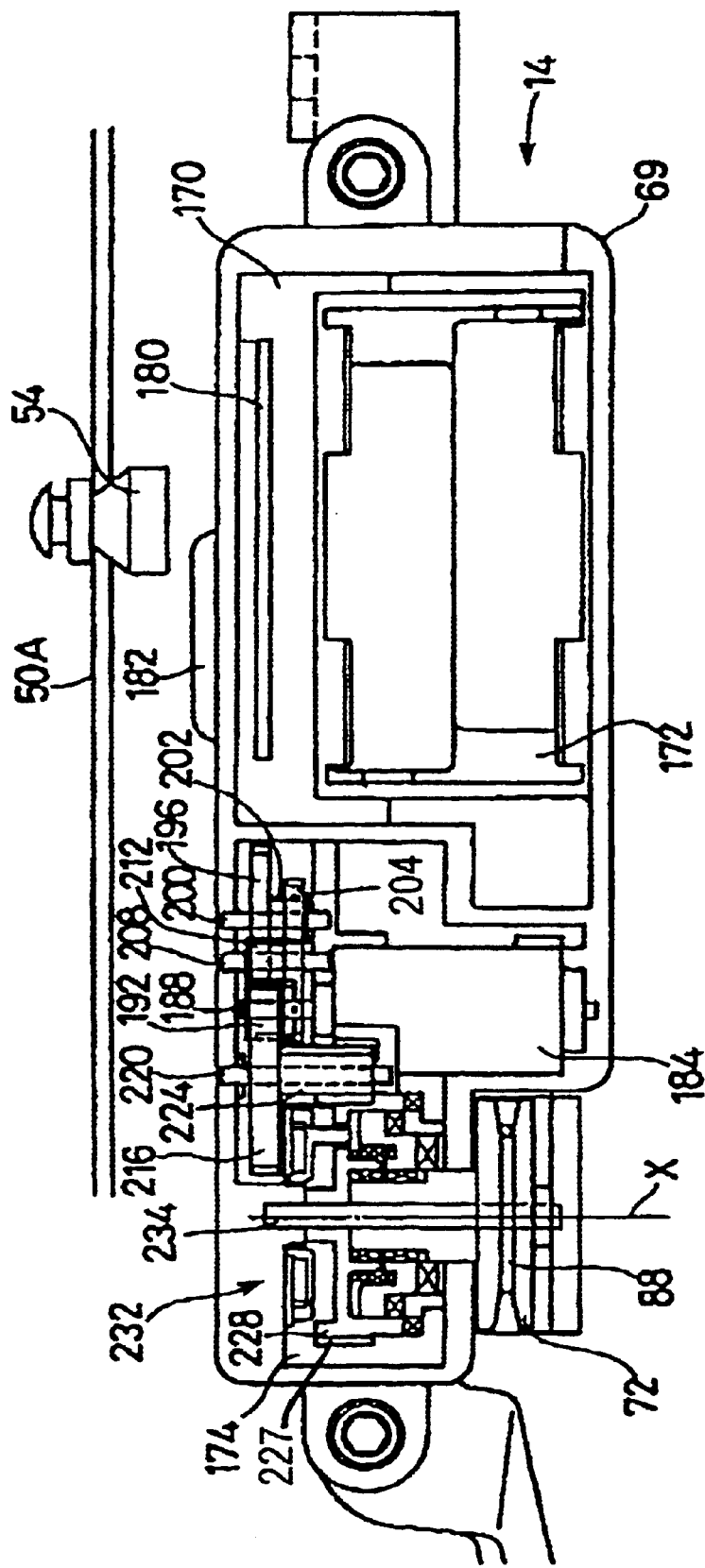
FIG. 5 is a partial cross sectional view of the motor drive unit shown in FIG. 2.

FIG. 5 is a partial cross sectional view of motor drive unit 14. Housing 69 defines an electronic control compartment 170, a battery compartment 172 and a motor drive compartment 174. Electronic control compartment 170 houses a printed circuit board 180 that includes a processor (not shown) and the necessary electronics to determine the speed of the bicycle and to control the winding and unwinding of control wire 84 based on the speed of the bicycle. A magnetic sensor 182 is disposed on the side of electronic control compartment 170 for sensing the passage of magnet 54 and for providing signals to the processor mounted on printed circuit board 180 indicating the rotational speed of wheel 50 and hence the speed of the bicycle. The processing of such signals is very well known. Battery compartment 172 holds four batteries used to power the circuitry on printed circuit board 180 and the motor 184 in motor drive compartment 174. FIG. 5 shows takeup member 72 exposed to the outside of housing 69 to facilitate connecting and disconnecting control wire 84, but if desired a removable protective cap 185 shown in FIG. 6 could be provided as part of motor drive compartment 174 to enclose takeup member 72.

Motor drive compartment 174 houses the hardware used to wind and unwind control wire 84. More specifically, motor 184 includes a drive shaft 188 with a drive gear 192 that engages a large diameter gear 196 pivotably mounted to motor drive compartment 174 through a pivot shaft 200. A small diameter gear 202 that rotates integrally with large diameter gear 196 engages a large diameter gear 204 pivotably mounted to motor drive compartment 174 through a pivot shaft 208. A small diameter gear 212 that rotates integrally with large diameter gear 204 engages a large diameter gear 216 pivotably mounted to motor drive compartment 174 through a pivot shaft 220. A small diameter gear 224 that rotates integrally with large diameter gear 216 engages a plurality of teeth 227 formed on the outer peripheral surface of a main gear 228 of a one-way clutch shift control device 232 that is pivotably mounted to motor drive compartment 174 through pivot shaft 234 for rotation around an axis X. Gears 196, 202, 204, 212, 216 and 224 form a gear reduction unit for stepping down the rate of rotation of drive gear 192 to main gear 228.

Figure 6:
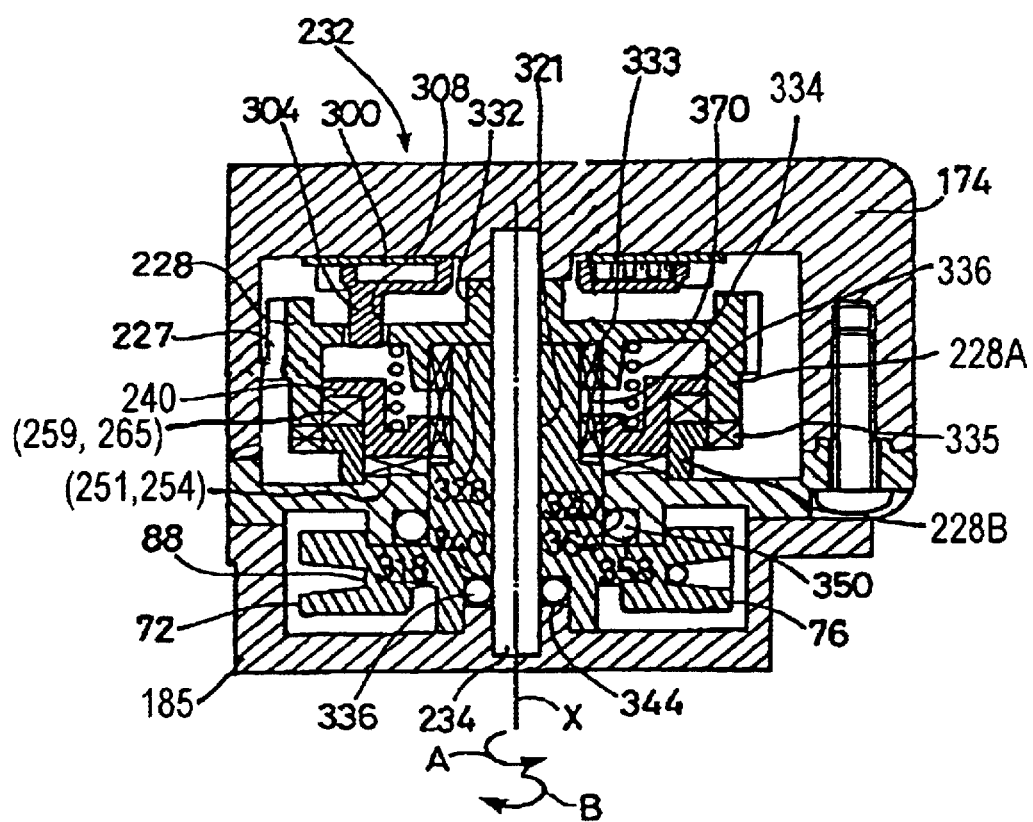
FIG. 6 is a more detailed cross sectional view of the shift control device used in the motor drive unit shown in FIG. 5

FIG. 6 is a more detailed cross sectional view of shift control device 232. Motor drive compartment 174 functions as a fixed first member, and main gear 228 functions as a second member rotatably mounted relative to motor drive compartment 174 for controlling the pulling and releasing of control wire 84, wherein main gear 228 rotates in a first direction indicated by arrow A in FIG. 6 and in a second direction indicated by arrow B in FIG. 6. An idler gear 240 functions as a third member coupled between motor drive compartment 174 and main gear 228. Idler gear 240 rotates around axis X and moves in the direction of axis X between an engaged position wherein idler gear 240 engages motor drive compartment 174 and a disengaged position wherein idler gear 240 is disengaged from motor drive compartment 174 as discussed in more detail below.

As shown schematically in FIG. 7A, main gear 228 includes a plurality of teeth 265 formed in a circular arc and having a plurality of drive surfaces 244 extending in the direction of axis X for engaging a complementary plurality of surfaces 248 on a plurality of teeth 259 formed in a circular arc on idler gear 240 for driving idler gear 240 in a third direction when main gear 228 rotates in the first direction A. In this embodiment, the third direction is the same as direction A. A space 250 is formed between drive surfaces 244 and surfaces 248 to perform an overshift function described below. Idler gear 240 also includes a plurality of teeth 251 formed in a circular arc and having positioning surfaces 256 extending in the direction of axis X for contacting a complementary surface 257 of a tooth 254 formed on motor drive compartment 174 for preventing idler gear 240 from rotating around axis X when idler gear 240 is in the engaged position. Positioning surfaces 256 function to hold idler gear 240 and hence main gear 228 and takeup member 72 in the positions required to set transmission 18 in each of the available gear ratios, wherein the distance between successive positioning surfaces 256 corresponds to the length of control wire 84 that is pulled or released to set the transmission 18 from one gear ratio to the next. In this embodiment, a height of drive surfaces 244 in the direction of axis X is greater than a height of positioning surfaces 256 in the direction of axis X for reasons discussed below.

Idler gear 240 also includes a plurality of first cam surfaces 252 formed on teeth 251 for contacting a complementary surface 253 of tooth 254 formed on motor drive compartment 174 for causing movement of idler gear 240 in the direction of axis X toward the disengaged position during rotation of idler gear 240 in the direction A. Additionally, idler gear 240 includes a plurality of second cam surfaces 260 formed on teeth 259 for contacting a complementary plurality of surfaces 264 on teeth 265 on main gear 228 for causing movement of idler gear 240 in the direction of axis X toward the disengaged position during rotation of main gear 228 in the direction B. Surfaces 252, 253, 256 and 257 are disposed in a plane P1 when idler gear 240 is in the engaged position shown in FIG. 7A. Similarly, surfaces 244, 248, 260 and 264 are disposed in a plane P2 when idler gear 240 is in the position shown in FIG. 7A. Planes P1 and P2 both are oriented substantially perpendicular to axis X, wherein plane P1 is spaced apart from plane P2 in the direction of axis X.

As shown in FIG. 6, a position sensor 300 in the form of a potentiometer is mounted to motor drive compartment 174. Potentiometer 300 includes a coupling tab 304 for engaging a coupling bore 308 in main gear 228 so that rotation of main gear 228 causes a corresponding rotation of coupling tab to cause position sensor 300 to output a resistance proportional to the position of main gear 228.

Takeup member 72 is rotatably mounted around pivot shaft 234, and it includes a large diameter cylindrical portion 318 that includes wire connector 76 and winding surface 88, an intermediate diameter cylindrical portion 320 and a small diameter cylindrical portion 324. Main gear 228 is sandwiched between an end face 328 of small diameter cylindrical portion 324 and an opposed end face 332 of motor drive compartment 174. Splines 333 formed on an inner peripheral surface of main gear 228 engage complementary splines 334 formed on an outer peripheral surface of small diameter cylindrical portion 324 so that takeup member 72 rotates integrally with main gear 228. Main gear 228 is formed as two pieces 228A and 228B interlocked by splines 335 to facilitate assembly. Idler gear 240 is nonrotatably but axially movably mounted around small diameter cylindrical portion 324 by splines 336 that engage splines 334 on small diameter cylindrical portion 324. A seal 336 is disposed around pivot shaft 234 between an end face 340 of large diameter cylindrical portion 318 and an opposed end face 344 of motor drive compartment 174. Another seal 350 is disposed around intermediate diameter cylindrical portion 320 between a face 354 of a wall 356 of motor drive compartment 174 that encircles intermediate diameter cylindrical portion 320 and an opposed face 358 of large diameter cylindrical portion 318. As a result of this structure, takeup member 72 and main gear 228 are generally immovable in the direction of axis X. Idler gear 240 is biased away from main gear 228 and toward wall 356 of motor drive compartment 174 by a coil spring 370.

The operation of shift control device 232 when motor 184 rotates main gear 228 in the direction A (which corresponds to a winding of control wire 84 around takeup member 72) will be described with reference to FIGS. 7A–7E. FIG. 7A shows shift control device in an initial steady state condition.

As main gear 228 moves in the direction A, drive surfaces 244 of main gear 228 first close the space 250 between them and the surfaces 248 on idler gear 240. Thereafter, drive surfaces 244 of main gear 228 press against surfaces 248 of idler gear 240 and rotate idler gear 240 around axis X in the direction A. As a result, the first cam surface 252 of the tooth 251 on idler gear 240 engaging tooth 254 slides against surface 253 of tooth 254 and pushes idler gear 240 to the left as shown in FIG. 7B. This movement continues until the tooth 251 jumps over tooth 254 as shown in FIGS. 7C and 7D and idler gear 240 moves back to the right as shown in FIG. 7D. Since a height of drive surfaces 244 of teeth 265 in the direction of axis X is greater than a height of positioning surfaces 256 of teeth 251 in the direction of axis X, idler gear 240 is able to disengage from tooth 254 without becoming disengaged from main gear 228. Since drive surface 244 of main gear 228 is contacting surface 248 on idler gear 240, the spaces 250 (FIG. 7A) formerly between drive surfaces 244 and surfaces 248 have been shifted and now appear as spaces 250' between second cam surfaces 260 and surfaces 264 as shown in FIG. 7D. During this operation, position sensor 300 moves from the position "L" shown in FIG. 7A to the position "N" shown in FIG. 7D.

Since takeup member 72 rotates integrally with main gear 228, at this time control wire 84 has been pulled by an amount corresponding to the sum of the distance of the original space 250 between drive surfaces 244 and surfaces 248 on main gear 228 plus the distance between the positioning surface 256 originally contacting surface 257 of tooth 254 and the positioning surface 256 now contacting surface 257 of tooth 254. Thus, at this time control wire 84 seemingly has been pulled more than required to shift transmission 18 from one gear ratio to the next. This phenomenon is known as overshift, and it is used to compensate for slack in the mechanical components or any resistance in the mechanical gears to the gear change operation. Once the gear change operation in transmission 18 occurs, the excess amount of cable pull is no longer required. Thus, after the gear change operation in transmission 18 occurs, the drive force of motor 184 is relaxed. Since control wire 84 pulls on takeup member 72 as a result of the force of the return spring in transmission 18, main gear 228 rotates slightly in the direction B until second cam surfaces 260 on teeth 259 contact surfaces 264 on teeth 265 and space 250 once again appears between drive surfaces 244 and surfaces 248 as shown in FIG. 7E. Control wire 84 is released by the distance corresponding to space 250, and the excess cable pull is removed. Since the position of takeup member 72 is maintained by contact between positioning surface 256 and surface 257 of tooth 254, the force required to hold takeup member 72 in that position need not be supplied by motor 184, thus greatly reducing wear and tear on motor 184.

The operation of shift control device 232 when motor 184 rotates main gear 228 in the direction B (which corresponds to unwinding control wire 84 from takeup member 72) will be described with reference to FIGS. 8A–8D. FIG. 8A shows shift control device 232 in an initial steady state condition, which in this case is in the "T" position indicated by position sensor 300.

As main gear 228 moves in the direction B, surfaces 264 on teeth 265 of main gear 228 slide against second cam surfaces 260 on idler gear 240 and push idler gear 240 to the left as shown in FIG. 8B. This movement continues until the positioning surface 256 of the tooth 251 on idler gear 240 that is engaging tooth 254 on motor drive compartment 174 moves past the tip of tooth 254 and the tooth 251 jumps over tooth 254 as shown in FIGS. 8C and 8D and idler gear 240 moves back to the right as shown in FIG. 8D. As noted above, since a height of drive surfaces 244 of teeth 265 in the direction of axis X is greater than a height of positioning surfaces 256 of teeth 251 in the direction of axis X, idler gear 240 is able to disengage from tooth 254 without becoming disengaged from main gear 228. It should be noted that no overshift occurs when main gear 228 is rotated in this direction. During this operation, position sensor 300 moves from the position "T" shown in FIG. 8A to the position "N" shown in FIG. 8D.

While the above is a description of one embodiment of the present invention, various modifications may be employed without departing from the spirit of the invention. Consequently, the scope of the invention should not be limited to the specific structures disclosed. Instead, the true scope of the invention should be determined by the following claims.

What is claimed is:

1. A bell crank for a bicycle hub transmission comprising:
   a wire connecting bell crank member for connecting to a control wire;
   wherein the wire connecting bell crank member includes a horn extending circumferentially from a circumferential side of the wire connecting bell crank member and forming a wire winding surface;
   an actuator moving bell crank member having a contact portion structured to press against an actuating rod of the bicycle hub transmission;
   wherein the wire connecting bell crank member moves relative to the actuator moving bell crank member; and
   an adjusting mechanism for moving the wire connecting bell crank member relative to the actuator moving bell crank member to adjust a position of the wire connecting bell crank member relative to the actuator moving bell crank member;
   wherein the foregoing structures do not form part of a derailleur.

2. The bell crank according to claim 1 wherein the wire connecting bell crank member and the actuator moving bell crank member rotate around a common axis.

3. The bell crank according to claim 2 wherein the adjusting mechanism adjusts a rotational angle of the wire connecting bell crank member relative to the actuator moving bell crank member.

4. The bell crank according to claim 1 wherein the adjusting mechanism comprises an adjusting screw retained to one of the wire connecting bell crank member and the actuator moving bell crank member.

5. The bell crank according to claim 4 wherein the adjusting screw includes a screw end that provides a pressing force against the other one of the wire connecting bell crank member and the actuator moving bell crank member.

6. The bell crank according to claim 5 wherein the screw end contacts the other one of the wire connecting bell crank member and the actuator moving bell crank member.

7. The bell crank according to claim 5 wherein the adjusting screw includes a screw head, and further comprising a spring disposed around the screw between the screw head and the screw end.

8. The bell crank according to claim 5 wherein the adjusting screw includes a screw head, and further comprising a screw turning cap contacting the screw head for rotating the screw.

9. A bell crank for a bicycle hub transmission comprising:
   a wire connecting bell crank member for connecting to a control wire;
   an actuator moving bell crank member having a contact portion structured to press against an actuating rod of the bicycle hub transmission;
   wherein the wire connecting bell crank member moves relative to the actuator moving bell crank member;
   wherein at least one of the wire connecting bell crank member and the actuator moving bell crank member includes a first mounting ear and a second mounting ear, and wherein the other one of the wire connecting bell crank member and the actuator moving bell crank member is mounted between the first mounting ear and the second mounting ear; and
   an adjusting mechanism for moving the wire connecting bell crank member relative to the actuator moving bell crank member to adjust a position of the wire connecting bell crank member relative to the actuator moving bell crank member;
   wherein the foregoing structures do not form part of a derailleur.

10. The bell crank according to claim 9 further comprising a spacer disposed between the first mounting ear and the second mounting ear, wherein the other one of the wire connecting bell crank member and the actuator moving bell crank member is coupled to the spacer.

11. The bell crank according to claim 10 wherein the spacer is formed on the other one of the wire connecting bell crank member and the actuator moving bell crank member.

12. The bell crank according to claim 11 further comprising a pivot shaft extending through the spacer and connected to the first mounting ear and to the second mounting ear.

13. The bell crank according to claim 9 wherein the wire connecting bell crank member and the actuator moving bell crank member rotate around a common axis.

14. The bell crank according to claim 13 wherein the adjusting mechanism adjusts a rotational angle of the wire connecting bell crank member relative to the actuator moving bell crank member.

15. The bell crank according to claim 9 wherein the wire connecting bell crank member includes a wire winding surface.

16. The bell crank according to claim 9 wherein the adjusting mechanism comprises an adjusting screw retained to one of the wire connecting bell crank member and the actuator moving bell crank member.

17. The bell crank according to claim 16 wherein the adjusting screw includes a screw end that provides a pressing force against the other one of the wire connecting bell crank member and the actuator moving bell crank member.

18. The bell crank according to claim 17 wherein the screw end contacts the other one of the wire connecting bell crank member and the actuator moving bell crank member.

19. The bell crank according to claim 17 wherein the adjusting screw includes a screw head, and further comprising a spring disposed around the screw between the screw head and the screw end.

20. The bell crank according to claim 17 wherein the adjusting screw includes a screw head, and further comprising a screw turning cap contacting the screw head for rotating the screw.

21. A bell crank assembly comprising:
   a mounting bracket including:
      a motor mounting bracket portion;
      a transition bracket portion fixed relative to the motor mounting bracket portion and extending from the motor mounting bracket portion;
      a rear frame mounting bracket portion extending from the transition bracket portion;
      wherein the transition bracket portion is inclined relative to one of the motor mounting bracket portion and the rear frame mounting bracket portion;
      a bell crank mounting member disposed on one of the transition bracket portion and the rear frame mounting bracket portion;
   a bell crank including:
      a wire connecting bell crank member pivotably connected to the bell crank mounting member for connecting to a control wire;
      an actuator moving bell crank member pivotably connected to the bell crank mounting member and having a contact portion structured to press against an actuating rod of the bicycle hub transmission; and
   an adjusting mechanism for pivoting the wire connecting bell crank member relative to the actuator moving bell crank member to adjust a position of the wire connecting bell crank member relative to the actuator moving bell crank member;
   wherein the foregoing structures do not form part of a derailleur.

22. The bell crank according to claim 21 wherein the wire connecting bell crank member and the actuator moving bell crank member rotate around a common axis.

23. The bell crank according to claim 22 wherein the adjusting mechanism adjusts a rotational angle of the wire connecting bell crank member relative to the actuator moving bell crank member.

24. The bell crank according to claim 21 wherein the wire connecting bell crank member includes a wire winding surface.

25. The bell crank according to claim 21 wherein the adjusting mechanism comprises an adjusting screw retained to one of the wire connecting bell crank member and the actuator moving bell crank member.

26. The bell crank according to claim 25 wherein the adjusting screw includes a screw end that provides a pressing force against the other one of the wire connecting bell crank member and the actuator moving bell crank member.

27. The bell crank according to claim 26 wherein the screw end contacts the other one of the wire connecting bell crank member and the actuator moving bell crank member.

28. The bell crank according to claim 26 wherein the adjusting screw includes a screw head, and further comprising a spring disposed around the screw between the screw head and the screw end.

29. The bell crank according to claim 26 wherein the adjusting screw includes a screw head, and further comprising a screw turning cap contacting the screw head for rotating the screw.

30. The bell crank according to claim 21 wherein at least one of the wire connecting bell crank member and the actuator moving bell crank member includes a first mounting ear and a second mounting ear, and wherein the other one of the wire connecting bell crank member and the actuator moving bell crank member is mounted between the first mounting ear and the second mounting ear.

31. The bell crank according to claim 30 further comprising a spacer disposed between the first mounting ear and the second mounting ear, wherein the other one of the wire connecting bell crank member and the actuator moving bell crank member is coupled to the spacer.

32. The bell crank according to claim 31 wherein the spacer is formed on the other one of the wire connecting bell crank member and the actuator moving bell crank member.

33. The bell crank according to claim 32 further comprising a pivot shaft extending through the spacer and connected to the first mounting ear and to the second mounting ear.

34. The bell crank according to claim 21 wherein the wire connecting bell crank member includes a slotted wire connector structured for receiving a cable end bead therein.

35. A bell crank assembly comprising:
   a mounting bracket including:
      a motor mounting bracket portion;
      a transition bracket portion extending from the motor mounting bracket portion;
      a rear frame mounting bracket portion extending from the transition bracket portion;
      wherein the rear frame mounting bracket portion has an axle opening dimensioned to receive a rear wheel axle therein;
      wherein the transition bracket portion is inclined relative to one of the motor mounting bracket portion and the rear frame mounting bracket portion;
      a bell crank mounting member disposed on one of the transition bracket portion and the rear frame mounting bracket portion;
   a bell crank including:
      a wire connecting bell crank member pivotably connected to the bell crank mounting member for connecting to a control wire;
      an actuator moving bell crank member pivotably connected to the bell crank mounting member and having a contact portion structured to press against an actuating rod of the bicycle hub transmission; and
   an adjusting mechanism for pivoting the wire connecting bell crank member relative to the actuator moving bell crank member to adjust a position of the wire connecting bell crank member relative to the actuator moving bell crank member;
   wherein the foregoing structures do not form part of a derailleur.

* * * * *